US012652296B2

(12) United States Patent
Dunne et al.

(10) Patent No.: US 12,652,296 B2
(45) Date of Patent: Jun. 9, 2026

(54) SYSTEM, METHOD, AND COMPUTER PROGRAM FOR APPLICATION PROGRAMMING INTERFACE (API) SECURITY

(71) Applicant: Amdocs Development Limited, Limassol (CY)

(72) Inventors: Cameron Ross Dunne, Newbridge (IE); Bernard Heuse, Mougins (FR); Joe Hogan, Malahide (IE); Andrew D'Souza, Silver Spring, MD (US)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 173 days.

(21) Appl. No.: 18/660,084

(22) Filed: May 9, 2024

(65) Prior Publication Data

US 2025/0350611 A1      Nov. 13, 2025

(51) Int. Cl.
*H04L 9/40* (2022.01)

(52) U.S. Cl.
CPC ................................ *H04L 63/1416* (2013.01)

(58) Field of Classification Search
CPC .. H04L 63/1416; H04L 63/1425; G06N 20/00
See application file for complete search history.

(56) References Cited

U.S. PATENT DOCUMENTS

| | | | | |
|---|---|---|---|---|
| 8,082,335 | B2 * | 12/2011 | Mishra | H04L 41/145 709/224 |
| 10,425,465 | B1 * | 9/2019 | Jha | H04L 67/53 |
| 10,628,560 | B1 * | 4/2020 | Siranni | G06F 21/6281 |
| 11,818,134 | B1 | 11/2023 | Gibson et al. | |
| 2015/0043430 | A1 * | 2/2015 | Garcia Martin | H04L 61/4557 370/328 |
| 2016/0188386 | A1 * | 6/2016 | Lisi | H04L 67/02 719/328 |
| 2022/0210172 | A1 * | 6/2022 | Tan | G06N 20/00 |
| 2023/0086187 | A1 | 3/2023 | Tan et al. | |
| 2023/0164115 | A1 * | 5/2023 | Glazova | G06F 9/547 726/13 |
| 2023/0327955 | A1 * | 10/2023 | Bansal | H04L 41/0893 709/223 |

(Continued)

OTHER PUBLICATIONS

International Search Report and Written Opinion from PCT Application No. PCT/IB2025/054720, dated Jul. 3, 2025, 12 pages.

*Primary Examiner* — Daniel B Potratz
*Assistant Examiner* — Matthias Habtegeorgis
(74) *Attorney, Agent, or Firm* — Zilka-Kotab, P.C.

(57)      ABSTRACT

As described herein, a system, method, and computer program are provided for securing a network whose capabilities are accessible by external applications via an API. A request for one or more capabilities of a network is received from an application by an API Gateway of a platform that interfaces the network. Information associated with the request is input to a machine learning model to cause the machine learning model to predict whether the request is at least potentially malicious. The request is prevented from being sent to the network when the machine learning model predicts that the request is at least potentially malicious. The request is sent to the network when the machine learning model predicts that the request is not at least potentially malicious.

13 Claims, 7 Drawing Sheets

(56) References Cited

U.S. PATENT DOCUMENTS

| | | | | |
|---|---|---|---|---|
| 2023/0421562 A1* | 12/2023 | Hakim | .................. | H04L 41/16 |
| 2024/0019853 A1* | 1/2024 | Reynolds | ........... | G05B 19/4185 |
| 2025/0374054 A1* | 12/2025 | Zhang | ................ | H04W 12/084 |

* cited by examiner

100

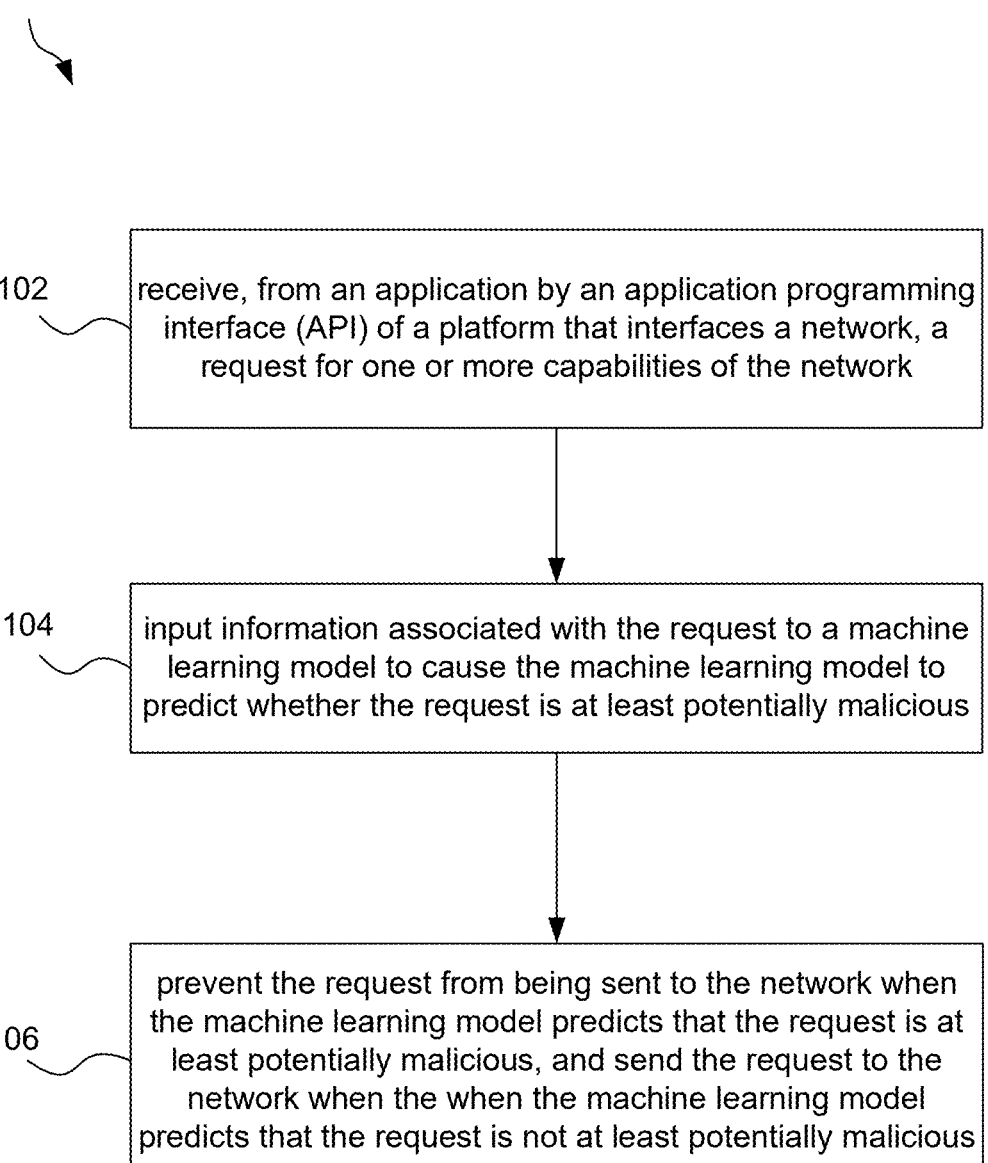

102 — receive, from an application by an application programming interface (API) of a platform that interfaces a network, a request for one or more capabilities of the network 104 — input information associated with the request to a machine learning model to cause the machine learning model to predict whether the request is at least potentially malicious 106 — prevent the request from being sent to the network when the machine learning model predicts that the request is at least potentially malicious, and send the request to the network when the when the machine learning model predicts that the request is not at least potentially malicious

APPLICATION
202

PLATFORM
204

API
GATEWAY
206

MACHINE
LEARNING
MODEL
208

NETWORK
210

600

SYSTEM, METHOD, AND COMPUTER PROGRAM FOR APPLICATION PROGRAMMING INTERFACE (API) SECURITY

FIELD OF THE INVENTION

The present invention relates to techniques to secure APIs against malicious requests.

BACKGROUND

An API is a software interface that allows two or more computer programs or components to communicate with each other. When an API is made public, it becomes more susceptible to malicious attacks. For example, an API may be publicly exposed by a platform to allow third party applications to access the services of a network operator. However, exposing the API over the Internet to external third party applications opens up both the network and the third party applications to malicious attacks via the API.

There is thus a need for addressing these and/or other issues associated with the prior art. For example, there is a need to expose APIs in a secure manner.

SUMMARY

As described herein, a system, method, and computer program are provided for securing an API. A request for one or more capabilities of a network is received from an application by an API of a platform that interfaces the network. Information associated with the request is input to a machine learning model to cause the machine learning model to predict whether the request is at least potentially malicious. The request is prevented from being sent to the network when the machine learning model predicts that the request is at least potentially malicious. The request is sent to the network when the machine learning model predicts that the request is not at least potentially malicious.

BRIEF DESCRIPTION OF THE DRAWINGS

FIG. 1 illustrates a method for securing an API, in accordance with one embodiment.

DETAILED DESCRIPTION

Figure 2:
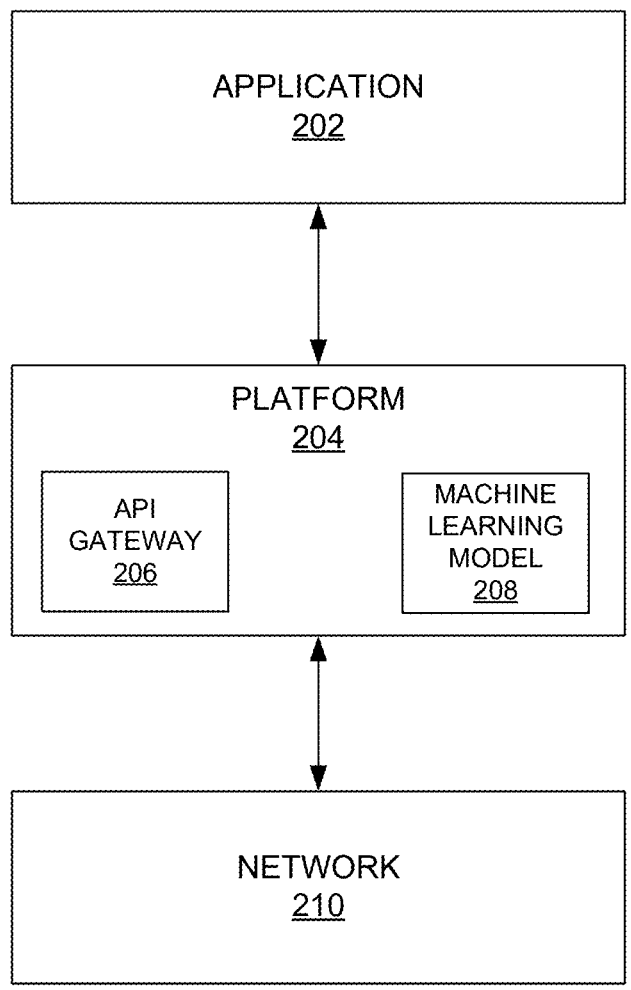
FIG. 2 illustrates a flow diagram of a system for securing an API that exposes network capabilities to third party applications, in accordance with one embodiment.

FIG. 1 illustrates a method 100 for securing an API, in accordance with one embodiment. The method may be carried out by a computer system, such as that described below with respect to FIGS. 6 and/or 7.

With respect to the present description, the API is deployed on a platform that interfaces authorized (third party) applications and the network. In an embodiment, the network may be provided by a communication service provider and the application may be provided by a third party to the communication service provider. The network may be a 4G network, a 5G network, etc. In an embodiment, subscribers may subscribe to obtain access to the network or access to services in the network. In an embodiment, the API exposes capabilities of the network to the applications. In an embodiment, the method 100 may be entirely performed by the platform.

In operation 102, a request for one or more capabilities of a network is received from an application by the platform via the API. The network includes various capabilities, such as network services, network functions, network information, network resources, etc. that are exposed to the application(s) via the API of the platform, such that the application(s) are able to access the capabilities of the network for their own purposes.

In various embodiments, the request may be to change a behavior of the network, for information relating to a subscriber of the network, and/or for information relating to the network. In an embodiment, the request subscribes to (i.e. indicates, instructs, etc.) at least one event notification that is of interest to the application. In another embodiment, the request informs of at least one parameter (e.g. bandwidth in the network) to be provisioned. In another embodiment, the request is for setup of an edge in the network. In another embodiment, the request is for a background data transfer. In another embodiment, the request informs of at least one provisioned traffic influence rule including for an immediate or planned setup of an edge in the network.

In operation 104, information associated with the request is input to a machine learning model to cause the machine learning model to predict whether the request is at least potentially malicious. This may also be referred to herein as performing a "security check." With respect to the present description, the machine learning model is a model trained using machine learning to predict whether a request issued to the API is malicious. In an embodiment, the machine learning model may be trained to recognize changes in behavior of the application, which may be indicative of a malicious actor taking control of the application and thus of the request being malicious (e.g. changes in the types of request that application normally makes, changes in a frequency of requests made by the application, changes in a number of instances of the application that are in communication with the API, etc.). In another embodiment, the machine learning model may be trained to recognize anomalies in requests received by the application, which may be indicative of a malicious actor taking control of the application and thus of the request being malicious. Malicious refers to intending to cause harm to the network and/or the application. In various examples, the machine learning model may be trained on a source of the application request or a frequency of API calls from a particular application along with a net effect of the number/frequency being to overwhelm the system (e.g. receiving from an application many complex requests).

In an embodiment, the information input to the machine learning model may include the request and metadata associated with the request. Inputting the request to the machine learning model may refer to inputting an indication of one or more parameters included in the request. For example, an indication of the one or more capabilities of the network being requested may be input to the machine learning model.

Further, the metadata refers to any data describing the request and/or a context of the request. In an embodiment, the metadata may include an internet protocol (IP) address of a source of the request and/or any other information describing a source of the request. In another embodiment, the metadata may include hypertext transfer protocol (HTTP) headers included with the request. In another embodiment, the metadata may include a frequency or number of API calls originating from the application over a defined period of time relevant to the latest request received in operation 102.

In operation 106, the request is prevented from being sent to the network when the machine learning model predicts that the request is at least potentially malicious, and the request is sent to the network when the when the machine learning model predicts that the request is not at least potentially malicious. Preventing the request from being sent to the network may include (e.g. the platform) preventing any response to the request from being sent to the application, sending an empty response to the application, or sending an error message to the application.

On the other hand, sending the request may include sending the request to the network via a network exposure function (NEF) of the platform. In an embodiment, sending the request may include determining (e.g. by the NEF) one or more network functions corresponding to the one or more capabilities in the network being requested, and then sending the request to those one or more network functions. In an embodiment when the request is sent to the network, a response to the request may be received from the network (e.g. by the platform). In an embodiment, the response from the network may be sent to the application (e.g. by the platform).

To this end, the method 100 may employ the machine learning model to secure the API that exposes capabilities of the network to the applications. In particular, the machine learning model is used to predict which application requests are at least potentially malicious, and to prevent those application request from being processed by the network. Non-malicious application requests may be forwarded to the network and processed by the network as usual.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

FIG. 2 illustrates a flow diagram of a system 200 for securing an API that exposes network capabilities to third party applications, in accordance with one embodiment. As an option, the system 200 may be implemented in the context of the details of the previous figure and/or any subsequent figure(s). Of course, however, the system 200 may be implemented in the context of any desired environment. Further, the aforementioned definitions may equally apply to the description below.

As shown, an application 202 interfaces a platform 204 which in turn interfaces a network 210. In an alternative embodiment, the platform 204 may interface with a business support system (BSS) or operations support system (OSS) component of the network 210 provider. The application 202 is provided by a third party to a provider of the network 210. While only one application 202 is shown, it should be noted that the platform 204 may similarly interface any number of different applications provided by any number of different third parties.

The platform 204 includes an API Gateway 206 which exposes capabilities of the network 210 to the application 202. The application 204 includes functionality that uses one or more of those capabilities. Accordingly, the application 204 is configured to send requests for one or more of those capabilities to the network 210 via the API Gateway 206.

To secure the API Gateway 206 against malicious requests, the platform 204 includes a machine learning model 208 that is trained to predict whether an incoming request from the application 202 is at least potentially malicious. The platform 204 will prevent the request from being sent to the network 210 when the machine learning model 208 predicts that the request is at least potentially malicious, and will send the request to the network 210 when the machine learning model 208 predicts that the request is not at least potentially malicious.

The platform 204 may be configured to perform other actions when preventing the request from being sent to the network 210, such as sending an empty response to the request back to the application 202 or sending an error message back to the application 202. On the other hand, when the platform 204 sends the request to the network 210, any response to the request issued by the network 210 will be sent back to the application 202 via the platform 204.

Figure 3:
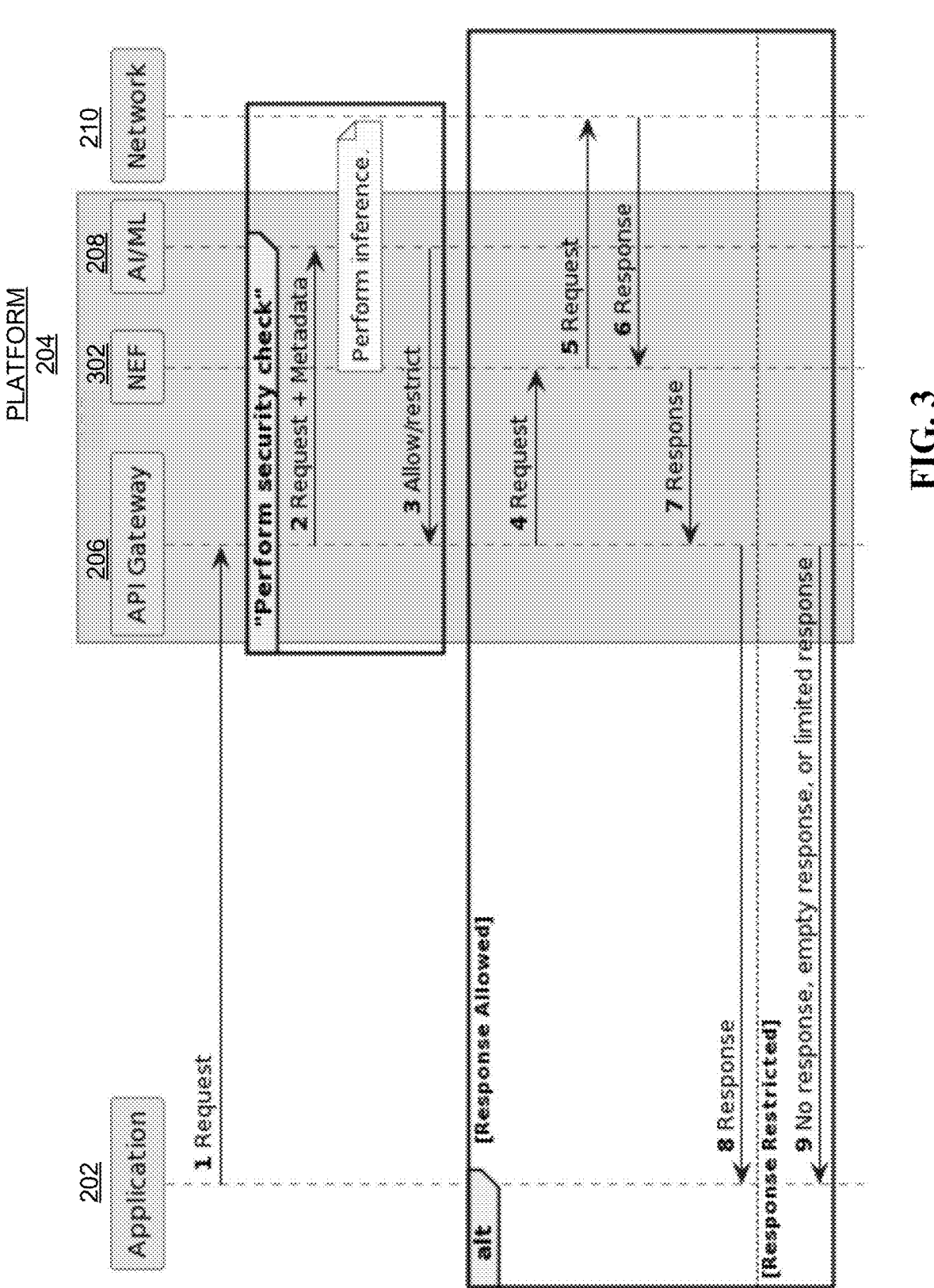
FIG. 3 illustrates a communication flow diagram of the system of FIG. 2, in accordance with one embodiment.

FIG. 3 illustrates a communication flow diagram of the system 200 of FIG. 2, in accordance with one embodiment. The communication flow diagram is just one example of the flow of communications that may occur within the system 200 of FIG. 2.

As shown, the application 202 sends a request to the API Gateway 206 of the platform 204. Exemplary requests are illustrated in Table 1.

TABLE 1

| | |
|---|---|
| 1. | A metaverse application may require that a user's traffic is routed to an edge application server. |
| 2. | A video streaming provider may request that a user is provided with a higher quality of service in the network. |
| 3. | A car manufacturer may request low-utilization (and hence low-cost) time windows to be provisioned so that it can deploy firmware updates to a fleet of vehicles. |
| 4. | A subscriber's mobile device may request a lower latency because it is starting to participate in a multi-player game. |
| 5. | An MNO's business customer or partner may request the creation (or update) of a network slice that supports their applications and services. |
| 6. | An MNO's business customer or partner may request the deployment of one or more of their applications at an edge location. |
| 7. | The services provided by the network operator may relate to providing information relating to the subscriber and/or the network, without making any changes to the network behavior, for example: |
| 8. | A banking application may require a user's approximate location to be verified as |

TABLE 1-continued part of an in-store credit card purchase.
9. A travel app may tailor its services to users who are roaming.
10. A gaming app may want to apply a microcharge to a user's account based upon
an
in-game purchase. (Note, this is an example of an API request that may be
fulfilled outside the network, in a BSS.)
11. An external application may request network status information for a specific
area/region.
12. A smart factory application may request device mobility network analytics
information from the network to assist in planning shipments.

In an embodiment, the API Gateway 206 then performs some internal operations based on the request (e.g. API orchestration, parameter mapping). The request and metadata associated with the request are then input to the machine learning model 208 for processing. The machine learning model 208 processes the input to predict (e.g. infer) whether the request is at least potentially malicious. The prediction is returned back to the API Gateway 206. Table 2 illustrates exemplary characteristics of an application 202 request that may cause the machine learning model 208 to predict that the request is at least potentially malicious.

TABLE 2

1. A sudden increase in the number of requests originating from a single
Application.
2. A change in the geographical spread from where requests are originating (e.g., it
would be suspicious if requests purporting to come from a German application
that is only available in Germany started to come from IP addresses in Asia).
3. A series of requests in which the only change is a single parameter relating to a
user identity, and this parameter is simply incrementing in each request.

The API Gateway 206 sends the request to a NEF 302 when it is predicted that the request is not at least potentially malicious (i.e. that the request is "safe" for the network 210). Upon receipt, the NEF 302 may determine the appropriate request and recipient (e.g. network function in the network 210) that it needs to send the request to. The NEF 302 sends the request to the network 210 (e.g. the determined network 210 recipient) and the network 210 in turn issues a response to the request which it sends back to the NEF 302. The NEF 302 then provides the response to the API Gateway 206 which sends the response to the application 202. In an embodiment, the API Gateway 206 may perform some internal operations (e.g. parameter mapping) prior to sending the response to the application 202.

It should be noted that in other embodiments the API Gateway 206 can send requests to other entities instead of the NEF 302 based upon the type and contents of the request received from the application 202, but the overall message choreography remains the same. For example, in some use cases, the API Gateway 206 may deliver the request to an End-to-End Service Orchestration (E2ESO) function in the network 210, and in other use cases the API Gateway 206 may deliver the request to a business support system (BSS) component in the network 210.

On the other hand, the API Gateway 206 prevents the request from being sent to the NEF 302 and in turn the network 210 when it is predicted that the request is at least potentially malicious. In this case, the API Gateway 206 may send an empty response to the request back to the application 202 or an error message back to the application 202. In even a further possible embodiment, a single request received by an entity (e.g. NEF 302) might cause it to send several further requests and subsequently aggregate the several responses into a single response back to the application 202.

Figure 4:
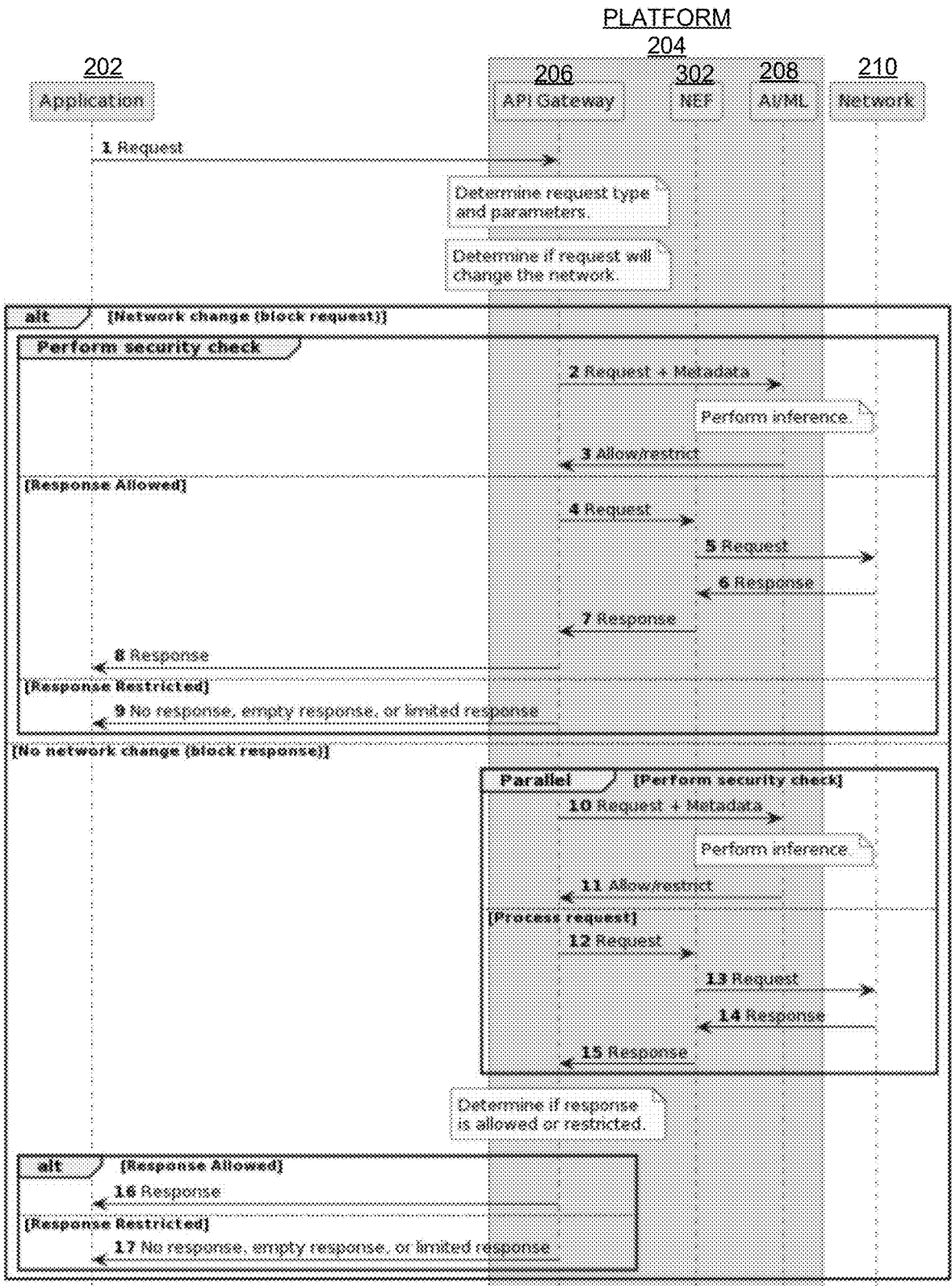
FIG. 4 illustrates a communication flow diagram of the system of FIG. 2, in accordance with another embodiment.

FIG. 4 illustrates a communication flow diagram of the system 200 of FIG. 2, in accordance with another embodiment. The communication flow diagram is just one example of the flow of communications that may occur within the system 200 of FIG. 2.

The present embodiment of the system 200 prevents the security check of the incoming application 202 request from adding to the overall latency of the system 200, particularly when the request is predicted to be at least potentially malicious and is prevented from being sent to the network 210.

The application 202 sends a request to the API Gateway 206 of the platform 204. The API Gateway 206 determines the request type and parameters. It will also determine if the request will cause the network 210 to change. For example, it may be determined whether the request type (e.g. the HTTP method) is one that makes a network change (e.g. the HTTP POST, PUT, or PATCH methods).

When the API Gateway 206 determines that the request will cause the network 210 to change, then the API Gateway 206 performs a security check on the request by inputting the request and associated metadata to the machine learning model 208 of the platform 204. The machine learning model 208 processes the input to predict (e.g. infer) whether the request is at least potentially malicious. The prediction is returned back to the API Gateway 206.

The API Gateway 206 sends the request to a NEF 302 when it is predicted that the request is not at least potentially malicious (i.e. that the request is "safe" for the network 210). Upon receipt, the NEF 302 may determine the appropriate request and recipient (e.g. network function in the network 210) that it needs to send the request to. The NEF 302 sends the request to the network 210 (e.g. the determined network 210 recipient) and the network 210 in turn issues a response to the request which it sends back to the NEF 302. The NEF 302 then provides the response to the API Gateway 206 which sends the response to the application 202. In an embodiment, the API Gateway 206 may perform some internal operations (e.g. parameter mapping) prior to sending the response to the application 202.

On the other hand, the API Gateway 206 prevents the request from being sent to the NEF 302 and in turn the network 210 when it is predicted that the request is at least potentially malicious. In this case, the API Gateway 206 may send an empty response to the request back to the application 202 or an error message back to the application 202. In even a further possible embodiment, a single request received by an entity (e.g. NEF 302) might cause it to send several further requests and subsequently aggregate the several responses into a single response back to the application 202.

Returning back to determination by the API Gateway 206 of whether the request will cause the network 210 to change, when the API Gateway 206 determines that the request will not cause the network 210 to change (e.g. the HTTP GET method) then the API Gateway 206 performs a security check on the request using the machine learning model 208 (as described above) in parallel with sending the request to the NEF 302 (as described above). In this case, if the machine learning model 208 predicts that the request is not at least potentially malicious, then any response received by the API Gateway 206 from the network 210 (as described above) is returned to the application 202. However, if the machine learning model 208 predicts that the request is at least potentially malicious, then any response received by the API Gateway 206 from the network 210 (as described above) is prevented from being sent to the application 202.

Figure 5:
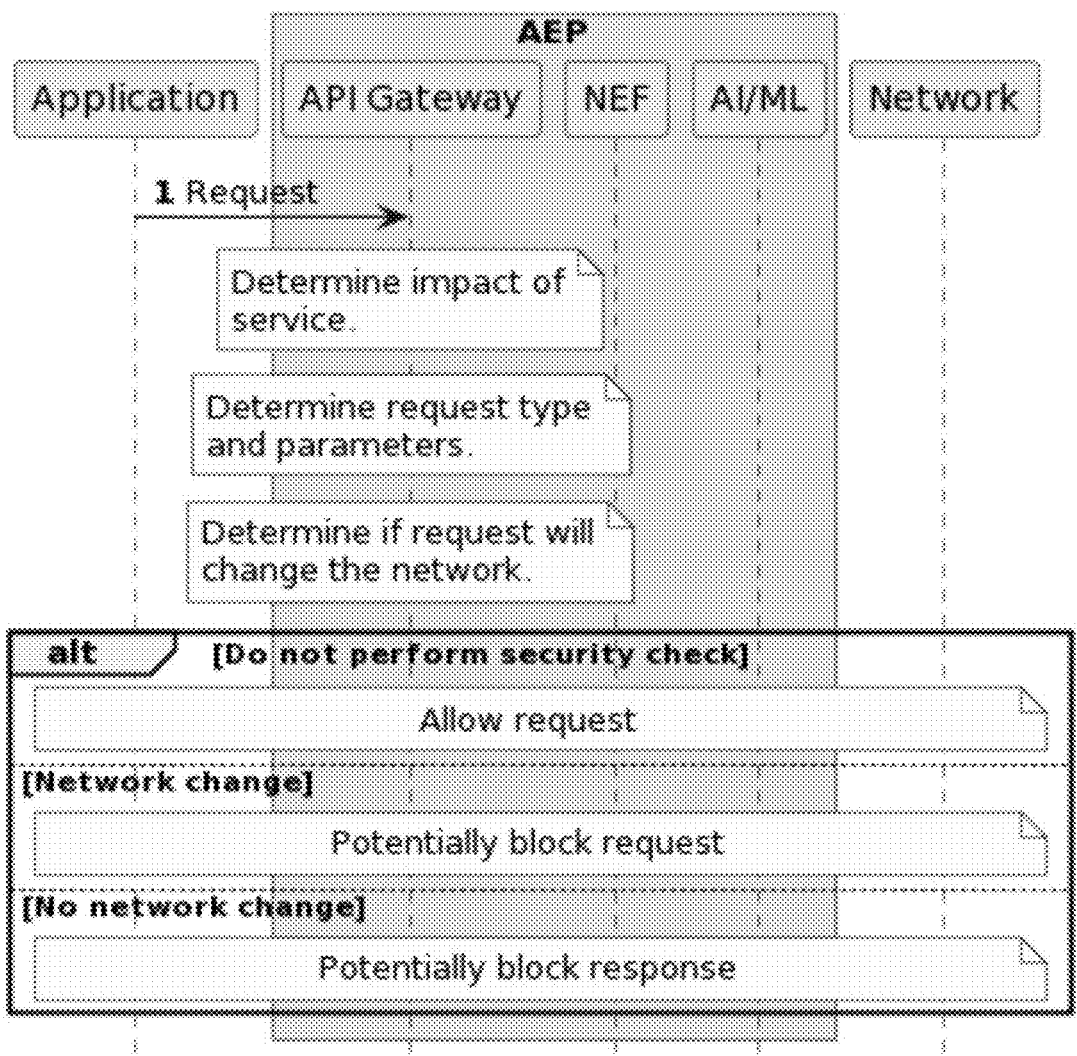
FIG. 5 illustrates a communication flow diagram of the system of FIG. 2, in accordance with yet another embodiment.

FIG. 5 illustrates a communication flow diagram of the system 200 of FIG. 2, in accordance with yet another embodiment. The communication flow diagram is just one example of the flow of communications that may occur within the system 200 of FIG. 2.

In another embodiment of the API Gateway 206 of the platform 204, the decision to perform a security check may be based upon the impact of the service on the application 202, an impact to a subscriber of the network 210, and/or an impact to the network 210 itself. For example, a request to obtain a subscriber's location has a significantly greater impact upon the subscriber's privacy than a request to obtain the duration for which the subscriber has used a current handset. As another example, an erroneous request to add $0.10 to a subscriber's balance will not annoy the subscriber, whereas an erroneous or malicious request to remove $5.00 from a subscriber's balance will annoy the subscriber. Similarly, an erroneous request to move a single subscriber's traffic onto a better network slice is unlikely to degrade the overall network performance, whereas an erroneous request to terminate a network slice may impact many subscribers and services using that network slice.

To this end, in the present embodiment the API Gateway 206 may cause a security check to be performed on the application 202 request when the request meets certain predefined criteria indicting that an impact of the request warrants the security check to be performed. The security check may be performed in accordance with either of the communication flows described in FIGS. 3-4.

Figure 6:
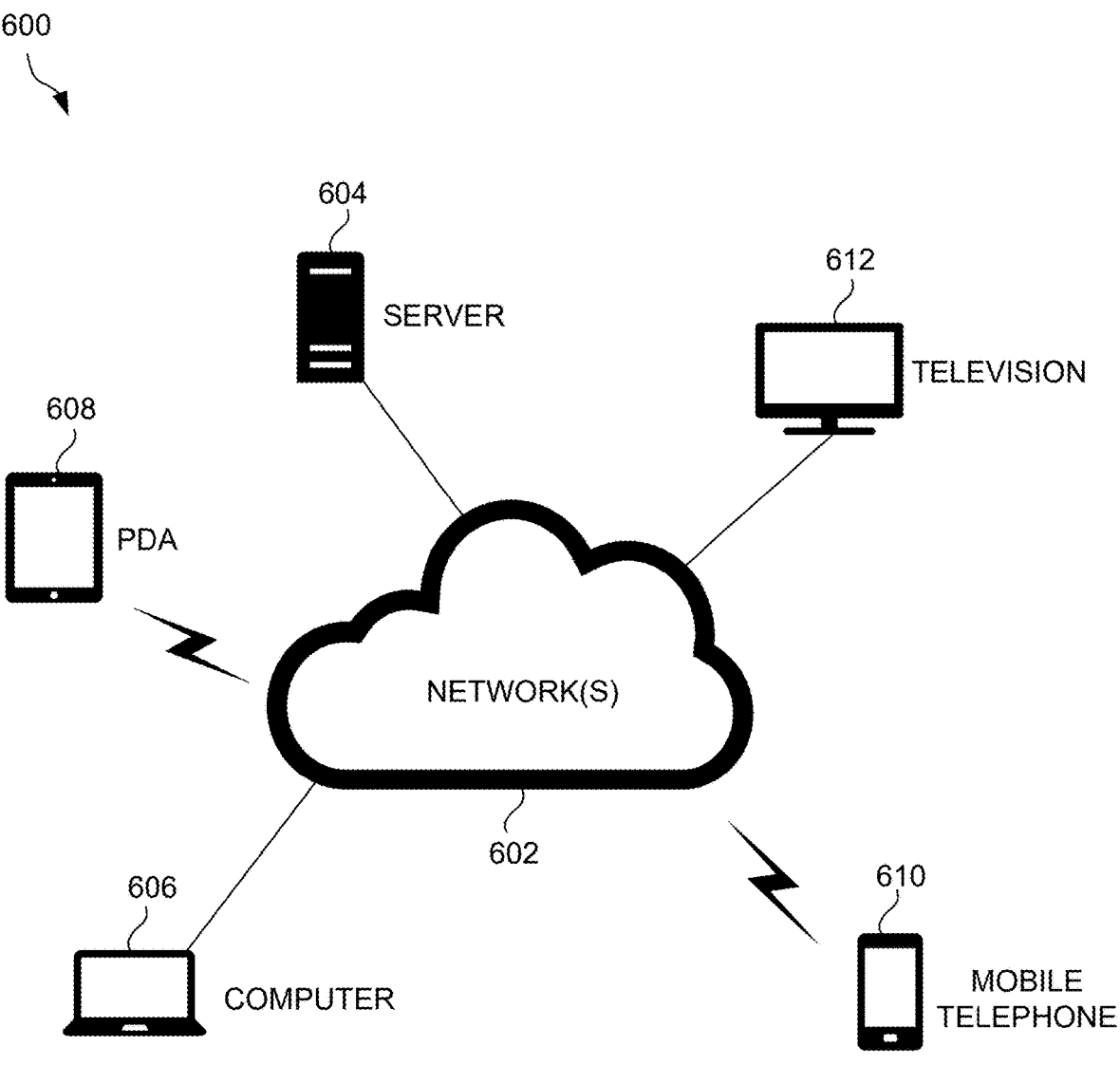
FIG. 6 illustrates a network architecture, in accordance with one possible embodiment.

FIG. 6 illustrates a network architecture 600, in accordance with one possible embodiment. As shown, at least one network 602 is provided. In the context of the present network architecture 600, the network 602 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 602 may be provided.

Coupled to the network 602 is a plurality of devices. For example, a server computer 604 and an end user computer 606 may be coupled to the network 602 for communication purposes. Such end user computer 606 may include a desktop computer, lap-top computer, and/or any other type of logic. Still yet, various other devices may be coupled to the network 602 including a personal digital assistant (PDA) device 608, a mobile phone device 610, a television 612, etc. While not shown, it should be noted that other devices that are not necessarily user devices may also be coupled to the network 602, including drones, industrial systems, connected objects, vehicles, industrial robots, etc. that access the network capabilities exposed via APIs.

Figure 7:
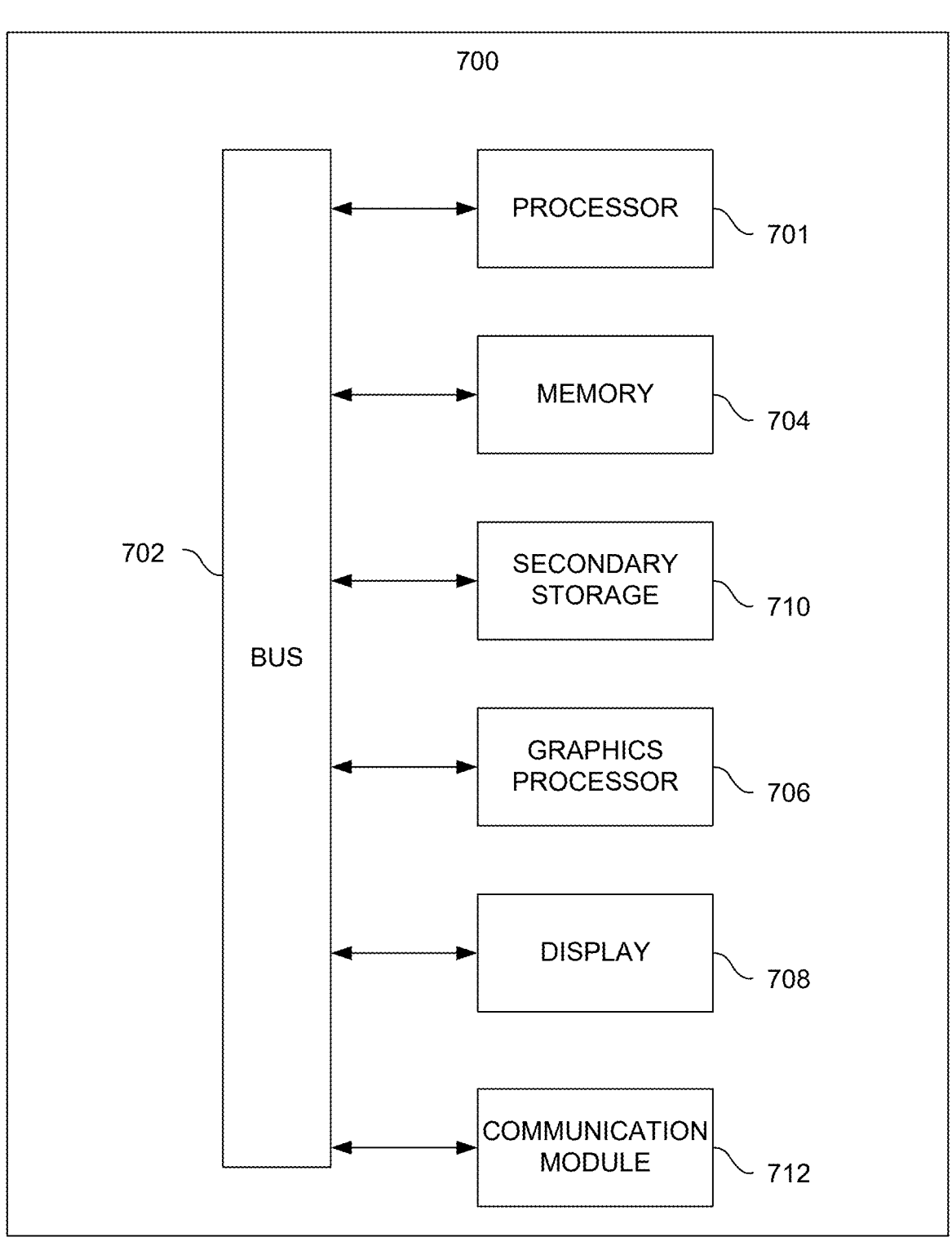
FIG. 7 illustrates an exemplary system, in accordance with one embodiment.

FIG. 7 illustrates an exemplary system 700, in accordance with one embodiment. As an option, the system 700 may be implemented in the context of any of the devices of the network architecture 600 of FIG. 6. Of course, the system 700 may be implemented in any desired environment.

As shown, a system 700 is provided including at least one central processor 701 which is connected to a communication bus 702. The system 700 also includes main memory 704 [e.g. random access memory (RAM), etc.]. The system 700 also includes a graphics processor 706 and a display 708.

The system 700 may also include a secondary storage 710. The secondary storage 710 includes, for example, solid state drive (SSD), flash memory, a removable storage drive, etc. The removable storage drive reads from and/or writes to a removable storage unit in a well-known manner.

Computer programs, or computer control logic algorithms, may be stored in the main memory 704, the secondary storage 710, and/or any other memory, for that matter. Such computer programs, when executed, enable the system 700 to perform various functions (as set forth above, for example). Memory 704, storage 710 and/or any other storage are possible examples of non-transitory computer-readable media.

The system 700 may also include one or more communication modules 712. The communication module 712 may be operable to facilitate communication between the system 700 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer-readable media storing computer instructions which when executed by one or more processors of a device cause the device to:

deploy a machine learning model and an application programming interface (API) gateway on a platform that interfaces a network and authorized third party applications to the network, wherein the API gateway includes at least one API that exposes capabilities of the network to the authorized third party applications, and wherein the machine learning model is trained to predict which requests from the authorized third party applications to the at least one API are at least potentially malicious;

receive, by the API gateway from one of the authorized third party applications, a new request for one or more capabilities of the network issued to the at least one API of the API gateway;

determine, by the API gateway, a type of the new request;

determine, by the API gateway, whether the type of the new request indicates a change to be made to the network;

(a) responsive to determining that the type of the new request indicates the change to be made to the network, secure the API gateway before sending the new request to the network by:

(i) determining, by the API gateway, metadata describing a context of the new request, the metadata including at least:

a frequency of API calls originating from the authorized third party application over a defined period of time that corresponds to the new request, (ii) processing information associated with the new request including the metadata, by the machine learning model, to predict whether the new request is at least potentially malicious, (iii) preventing, by the API gateway, the new request from being sent to the network when the machine learning model predicts that the new request is at least potentially malicious and returning to the authorized third party application one of an empty response or an error message, and (iv) sending, by the API gateway, the new request to the network when the machine learning model predicts that the new request is not at least potentially malicious, including:

determining, by the API gateway, a network destination for the new request based on a type of the new request and a content of the new request, delivering the new request to the network destination, and returning to the authorized third party application a response received from the network destination;

(b) responsive to determining that the type of the new request does not indicate the change to be made to the network, send the new request to the network in parallel with securing the API gateway by:

(i) determining, by the API gateway, the metadata describing the context of the new request, the metadata including at least:

the frequency of API calls originating from the authorized third party application over the defined period of time that corresponds to the new request, (ii) processing information associated with the new request including the metadata, by the machine learning model, to predict whether the new request is at least potentially malicious, (iii) receiving a response to the new request received from the network, (iv) preventing, by the API gateway, the response received from the network from being returned to the authorized third party application when the machine learning model predicts that the new request is at least potentially malicious and returning to the authorized third party application the one of the empty response or the error message, and (v) returning, by the API gateway, the response received from the network to the authorized third party application when the machine learning model predicts that the new request is not at least potentially malicious.

2. The non-transitory computer-readable of claim 1, wherein the capabilities of the network comprise network services, network functions, network information, and network resources.

3. The non-transitory computer-readable of claim 1, wherein the new request is to change a behavior of the network.

4. The non-transitory computer-readable of claim 1, wherein the new request is for information relating to a subscriber of the network.

5. The non-transitory computer-readable of claim 1, wherein the new request is for information relating to the network.

6. The non-transitory computer-readable of claim 1, wherein the information input to the machine learning model includes the new request and the metadata associated with the new request.

7. The non-transitory computer-readable of claim 6, wherein the metadata includes an internet protocol (IP) address of a source of the new request.

8. The non-transitory computer-readable of claim 6, wherein the metadata includes hypertext transfer protocol (HTTP) headers included with the new request.

9. The non-transitory computer-readable of claim 1, wherein sending the new request includes sending the new request to the network via a network exposure function (NEF) of the platform.

10. The non-transitory computer-readable of claim 1, wherein the machine learning model is trained to recognize changes in behavior of the authorized third party application.

11. The non-transitory computer-readable of claim 1, wherein the machine learning model is trained to recognize anomalies in requests received by the API gateway.

12. A method, comprising:

at a computer system:

deploying a machine learning model and an application programming interface (API) gateway on a platform that interfaces a network and authorized third party applications to the network, wherein the API gateway includes at least one API that exposes capabilities of the network to the authorized third party applications, and wherein the machine learning model is trained to predict which requests from the authorized third party applications to the at least one API are at least potentially malicious;

receiving, by the API gateway from one of the authorized third party applications, a new request for one or more capabilities of the network issued to the at least one API of the API gateway;

determining, by the API gateway, a type of the new request;

determining, by the API gateway, whether the type of the new request indicates a change to be made to the network;

(a) responsive to determining that the type of the new request indicates the change to be made to the network, securing the API gateway before sending the new request to the network by:

(i) determining, by the API gateway, metadata describing a context of the new request, the metadata including at least:

a frequency of API calls originating from the authorized third party application over a defined period of time that corresponds to the new request, (ii) processing information associated with the new request including the metadata, by the machine learning model, to predict whether the new request is at least potentially malicious, preventing, by the API gateway, the new request from being sent to the network when the machine learning model predicts that the new request is at least potentially malicious and returning to the authorized third party application one of an empty response or an error message, and (iv) sending, by the API gateway, the new request to the network when the machine learning model predicts that the new request is not at least potentially malicious, including:

determining, by the API gateway, a network destination for the new request based on a type of the new request and a content of the new request, delivering the new request to the network destination, and returning to the authorized third party application a response received from the network destination;

(b) responsive to determining that the type of the new request does not indicate the change to be made to the network, sending the new request to the network in parallel with securing the API gateway by:

(i) determining, by the API gateway, the metadata describing the context of the new request, the metadata including at least:

the frequency of API calls originating from the authorized third party application over the defined period of time that corresponds to the new request, (ii) processing information associated with the new request including the metadata, by the machine learning model, to predict whether the new request is at least potentially malicious, (iii) receiving a response to the new request received from the network, (iv) preventing, by the API gateway, the response received from the network from being returned to the authorized third party application when the machine learning model predicts that the new request is at least potentially malicious and returning to the authorized third party application the one of the empty response or the error message, and (v) returning, by the API gateway, the response received from the network to the authorized third party application when the machine learning model predicts that the new request is not at least potentially malicious.

13. A system, comprising:

a non-transitory memory storing instructions; and one or more processors in communication with the non-transitory memory that execute the instructions to:

deploy a machine learning model and an application programming interface (API) gateway on a platform that interfaces a network and authorized third party applications to the network, wherein the API gateway includes at least one API that exposes capabilities of the network to the authorized third party applications, and wherein the machine learning model is trained to predict which requests from the authorized third party applications to the at least one API are at least potentially malicious;

receive, by the API gateway from one of the authorized third party applications, a new request for one or more capabilities of the network issued to the at least one API of the API gateway;

determine, by the API gateway, a type of the new request;

determine, by the API gateway, whether the type of the new request indicates a change to be made to the network;

(a) responsive to determining that the type of the new request indicates the change to be made to the network, secure the API gateway before sending the new request to the network by:

(i) determining, by the API gateway, metadata describing a context of the new request, the metadata including at least:

a frequency of API calls originating from the authorized third party application over a defined period of time that corresponds to the new request, (ii) processing information associated with the new request including the metadata, by the machine learning model, to predict whether the new request is at least potentially malicious, (iii) preventing, by the API gateway, the new request from being sent to the network when the machine learning model predicts that the new request is at least potentially malicious and returning to the authorized third party application one of an empty response or an error message, and (iv) sending, by the API gateway, the new request to the network when the machine learning model predicts that the new request is not at least potentially malicious, including:

determining, by the API gateway, a network destination for the new request based on a type of the new request and a content of the new request, delivering the new request to the network destination, and returning to the authorized third party application a response received from the network destination;

(b) responsive to determining that the type of the new request does not indicate the change to be made to the network, send the new request to the network in parallel with securing the API gateway by:

(i) determining, by the API gateway, the metadata describing the context of the new request, the metadata including at least:

the frequency of API calls originating from the authorized third party application over the defined period of time that corresponds to the new request, (ii) processing information associated with the new request including the metadata, by the machine learning model, to predict whether the new request is at least potentially malicious, (iii) receiving a response to the new request received from the network, (iv) preventing, by the API gateway, the response received from the network from being returned to the authorized third party application when the machine learning model predicts that the new request is at least potentially malicious and returning to the authorized third party application the one of the empty response or the error message, and (v) returning, by the API gateway, the response received from the network to the authorized third party application when the machine learning model predicts that the new request is not at least potentially malicious.

* * * * *